United States Patent
Lukac et al.

(10) Patent No.: US 8,295,593 B2
(45) Date of Patent: Oct. 23, 2012

(54) METHOD OF DETECTING RED-EYE OBJECTS IN DIGITAL IMAGES USING COLOR, STRUCTURAL, AND GEOMETRIC CHARACTERISTICS

(75) Inventors: Rastislav Lukac, North York, CA (US); Bojan Ljubuncic, Kitchener, CA (US); Christopher V Olekas, Toronto, CA (US)

(73) Assignee: Seiko Epson Corporation, Tokyo (JP)

(*) Notice: Subject to any disclaimer, the term of this patent is extended or adjusted under 35 U.S.C. 154(b) by 961 days.

(21) Appl. No.: 12/349,911

(22) Filed: Jan. 7, 2009

(65) Prior Publication Data

US 2010/0172575 A1 Jul. 8, 2010

(51) Int. Cl.
G06K 9/00 (2006.01)
G06K 9/40 (2006.01)
(52) U.S. Cl. .......................... 382/165; 382/275
(58) Field of Classification Search .................. 382/165, 382/164, 275, 181; 348/241
See application file for complete search history.

(56) References Cited

U.S. PATENT DOCUMENTS

| | | | |
|---|---|---|---|
| 5,130,789 A | 7/1992 | Dobbs et al. | |
| 5,748,764 A | 5/1998 | Benati et al. | |
| 5,990,973 A | 11/1999 | Sakamoto | |
| 6,204,858 B1* | 3/2001 | Gupta | 345/600 |
| 6,895,112 B2 | 5/2005 | Chen et al. | |
| 7,224,850 B2 | 5/2007 | Zhang et al. | |
| 7,310,443 B1 | 12/2007 | Kris et al. | |
| 2003/0007687 A1* | 1/2003 | Nesterov et al. | 382/167 |
| 2004/0114829 A1* | 6/2004 | LeFeuvre et al. | 382/275 |
| 2004/0213476 A1* | 10/2004 | Luo et al. | 382/254 |
| 2005/0047656 A1* | 3/2005 | Luo et al. | 382/167 |
| 2005/0094895 A1 | 5/2005 | Baron | |
| 2005/0169520 A1 | 8/2005 | Chen et al. | |
| 2006/0072815 A1* | 4/2006 | Wu et al. | 382/167 |
| 2006/0098867 A1 | 5/2006 | Gallagher | |
| 2006/0280363 A1* | 12/2006 | Umeda | 382/167 |
| 2007/0036438 A1* | 2/2007 | Thakur | 382/190 |
| 2007/0140589 A1* | 6/2007 | Umeda | 382/275 |

(Continued)

FOREIGN PATENT DOCUMENTS

| | | |
|---|---|---|
| JP | 2004086891 | 3/2004 |
| JP | 2005196385 | 7/2005 |

OTHER PUBLICATIONS

Red Eye Removal Using Digital Color Image Processing, Jon Y. Hardeberg, Conexant Systems, Inc. Redmond, Washington, PICS 2001, Apr. 22-25, 2001, (pp. 283-287).

(Continued)

Primary Examiner — Wenpeng Chen (57) ABSTRACT

Disclosed are methods, devices, and computer program products for red-eye detection in a digital image. In one example embodiment, a method for detecting a red-eye effect in a digital image includes several acts. First, red pixels having a predetermined degree of redness are identified in the image. Next, redness contrast is detected with respect to each of the red pixels and redness is then enhanced for those red pixels having a predetermined level of redness contrast. The pixels identified as being red are then further refined by applying another redness threshold based on one or more color characteristics associated with the red pixels. The refined set of red pixels may then be partitioned into a set of one or more candidate red-eye objects. A candidate red-eye object may be removed as a false positive based on geometric constraints associated with red-eye objects and/or proximity of the object to pixels with human skin-like color tones.

15 Claims, 2 Drawing Sheets

U.S. PATENT DOCUMENTS

2009/0034840 A1* 2/2009 Umeda et al. ............... 382/168
2010/0158363 A1* 6/2010 Jiang et al. .................. 382/165

OTHER PUBLICATIONS

Automatic Multi-Layer Red-Eye Detection, Po-Hao Huang, Yu-Chieh Chien, Shang-Hong Lai, Department of Computer Science, National Tsing Hua University, Hsinchu, Taiwan, Image Processing, 2006 IEEE International Conference on Publication Date Oct. 8-11, 2006, (pp. 2013-2016).

Automatic Red-Eye Detection and Correction, Matthew Gaubatz, Cornell University, Robert Ulichney, Hewlett-Packard Co., IEEE Signal Process, Sep. 22-25, 2002, (pp. 1-804-1-807).

* cited by examiner

METHOD OF DETECTING RED-EYE OBJECTS IN DIGITAL IMAGES USING COLOR, STRUCTURAL, AND GEOMETRIC CHARACTERISTICS

THE FIELD OF THE INVENTION

Embodiments of the invention relate to digital image processing. More specifically, disclosed embodiments relate to methods, devices, and computer-readable media for detecting a red-eye effect in digital images.

BACKGROUND

A red-eye effect occurs in images due to the ambient lighting conditions being relatively low when a flash is used. A human eye will adapt to the low lighting by dilating the pupil. When the photograph is captured, the light from the flash will enter the dilated pupil, illuminating red blood vessels in the retina. Red-eye detection is an image analysis technique used to localize red-eye effects in digital color photographs captured using a flash.

SUMMARY OF EXAMPLE EMBODIMENTS

In general, example embodiments relate to methods, devices, and computer-readable media for detecting a red-eye effect in digital images.

In a first example embodiment, a method for red-eye detection in an image includes several acts. First, a first set of red pixels having a predetermined degree of redness are identified in the image. Next, redness contrast is detected in a plurality of directions with respect to each pixel in the first set of red pixels. Redness of pixels in the first set of red pixels is then enhanced for those pixels having a predetermined level of redness contrast in at least one of the plurality of directions. Next, the method includes identifying a second set of pixels from the first set of red pixels by deriving one or more color characteristics associated with individual pixels in the first set of red pixels and comparing one or more color characteristics to one or more corresponding color characteristics common to all of the pixels in the first set of red pixels. The pixels in the second set of red pixels may then be partitioned into a set of one or more candidate red-eye objects and candidate red-eye objects may be removed based on geometric constraints and/or proximity to pixels of a human skin-like color. For example, a candidate red-eye object is removed from the set of one or more candidate red-eye objects if certain geometric constraints are not met. In addition, after performing image-adaptive gamma correction on the image using a gray-scaled version of the image, a candidate red-eye object is removed from the set based on whether pixels of color tones corresponding to human skin color tones are detected in the gamma-corrected image in a predetermined number of directions proximate to the candidate red-eye object.

In a second example embodiment, a method for red-eye detection in an input image includes enhancing redness in input image pixels having a threshold level of redness contrast. Candidate red-eye pixels are then identified in the enhanced image.

In a third example embodiment, a method for red-eye detection in an input image includes generating a gamma-corrected image by performing image-adaptive gamma correction on at least a portion of the input image based on gray-scale intensity values of input image pixels. Then, an object in the input image is identified as a candidate red-eye object based on whether, in the gamma-corrected image, pixels of a human skin-like color are detected proximate to the object in a predetermined number of directions.

In a fourth example embodiment, a method for red-eye detection in an input image includes identifying, in the image, a set of red pixels having a predetermined level of redness contrast with respect to neighboring pixels and partitioning pixels in the set of red pixels into a set of one or more candidate red-eye objects.

In a fifth example embodiment, one or more computer-readable media have computer-readable instructions thereon which, when executed, implement the method for red-eye detection in an image discussed above in connection with the first example embodiment.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for detecting red-eye objects in images. Example embodiments can be used in conjunction with red-eye correction applications to produce images in which red-eye objects are detected and modified to remove or minimize the red-eye effect. Consequently, image quality may be enhanced automatically with little or no user manipulation of the image.

Example embodiments detect a red-eye effect in images by evaluating, among other things, color, structural, and geometric characteristics of pixels and objects in an input image to localize red-eye candidate objects and refine initial detection results by distinguishing between true and false red-eye objects. For example, in each pixel location with a dominant contribution of a red component, color and structural characteristics may be used to localize abrupt changes in a redness function and enhance redness of such red pixels. Then, red-eye pixel candidates may be identified by operating in the enhanced image and comparing each pixel's color characteristics with global redness statistics. Identification of red-eye pixel candidates may result in a binary candidate red-eye pixel map, which may undergo pixel labeling-based object segmentation. Each segmented object may be evaluated subject to geometric constraints to eliminate objects with a size and/or shape that are atypical for a red-eye object. The remaining objects may undergo color-based verification using adaptive gamma-correction and human skin color modeling to further refine red-eye detection results. Methods consistent with the invention may be implemented in image capture devices such as scanners or digital cameras, as well as in software modules including printer drivers or image editing software, among other things.

Figure 1:
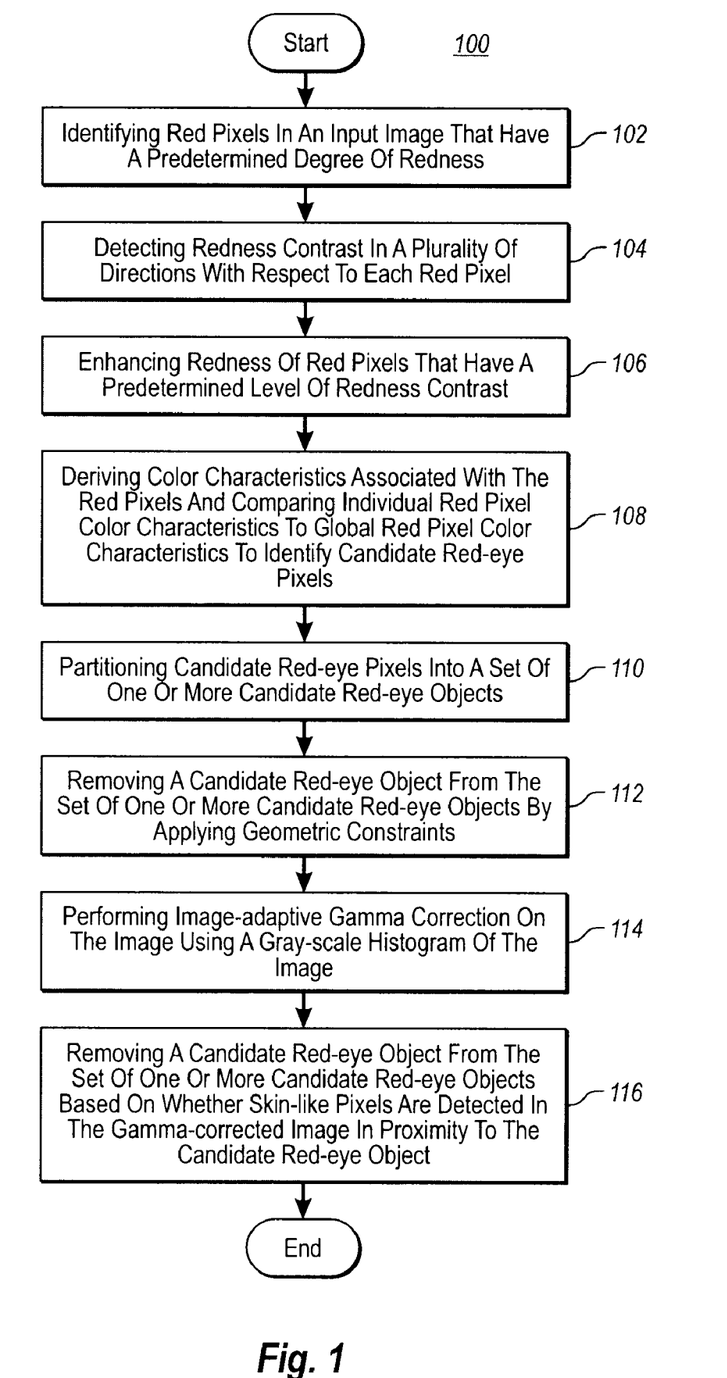
FIG. 1 discloses an example method for processing an image to detect a red-eye effect.

With reference now to FIG. 1, an example method 100 for red-eye detection is disclosed. More particularly, the example method 100 identifies objects in the image and determines whether the objects are candidate red-eye objects. Each candidate red-eye object may then be eliminated or retained as a candidate by evaluating characteristics such as size, shape, and contextual aspects of the object.

The example method 100 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include a red-eye detection capability, for example, to detect red-eye effects in an image. For example, an image capture device, such as a camera or scanner, with this red-eye detection capability may include one or more computer-readable media that implement the example method 100. Alternatively, a computer connected to the image capture device may include one or more computer-readable media that implement the example method 100.

Figure 2:
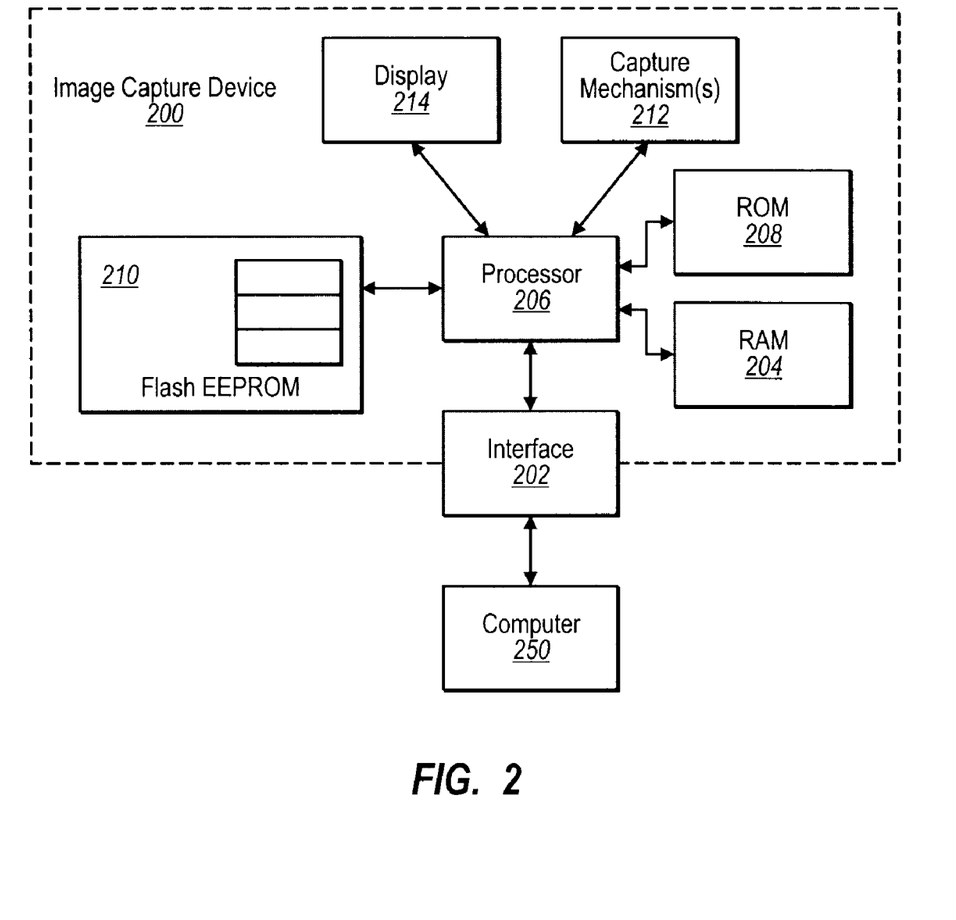
FIG. 2 is a schematic representation of an example image capture device.

A schematic representation of an example image capture device 200 is disclosed in FIG. 2. The example image capture device 200 exchanges data with a host computer 250 by way of an intervening interface 202. Application programs and an image capture device driver may also be stored for access on the host computer 250. When an image retrieve command is received from the application program, for example, the image capture device driver controls conversion of the command data to a format suitable for the image capture device 200 and sends the converted command data to the image capture device 200. The driver also receives and interprets various signals and data from the image capture device 200, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the image capture device 200 from the capture mechanism(s) 212, the flash EEPROM 210, or the ROM 208. For example, the capture mechanism(s) 212 can generate a digital photographic image. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the method 100 for example. Where the data in the receive buffer of the RAM 204 is a digital image, for example, the processor 206 can implement the methodological acts of the method 100 on the digital image to detect red-eye objects in the digital image and thereby remove or minimize red-eye effects. Further processing in an imaging pipeline may then be performed on the digital image before the image is displayed by the image capture device 200 on a display 214, such as an LCD display for example, or transferred to the host computer 250, for example.

The example method 100 for detecting red-eye effects in an image will now be discussed in connection with FIG. 1. Prior to performing method 100, an input image can be targeted for various image processing operations including red-eye detection. The targeted input image may be a digital color image or a digitized or scanned version of a color image. Various image processing techniques may be applied to the targeted input image before method 100 is performed.

The input image may be a red-green-blue (RGB) color image x with $K_1 \times K_2$ pixels. The pixels in the input image x may be defined as $x_{(r,s)} = [x_{(r,s)1}, x_{(r,s)2}, x_{(r,s)3}]$, where $x_{(r,s)1}$, $x_{(r,s)2}$, and $x_{(r,s)3}$ denote the R, G and B color components, respectively. In the description below, the color components corresponding to each pixel may have an intensity value ranging from a minimum of 0 to a maximum of 255. However, as will be understood by those of ordinary skill in the art, the number of color components and their minimum and maximum intensity values may vary according to different color spaces and coordinate systems. The term (r,s) denotes the pixel location with $r=1, 2, \ldots, K_1$ and $s=1, 2 \ldots, K_2$ indicating the image row and column, respectively. Red-eye detection may be performed to extract the retina's pixels having a red coloration. Thus, a red-eye detection procedure may produce a binary candidate red-eye pixel map d with $K_1 \times K_2$ pixels, where the value $d_{(r,s)}=1$ indicates that $x_{(r,s)}$ is a candidate red-eye pixel and $d_{(r,s)}=0$ denotes that $x_{(r,s)}$ is not a candidate red-eye pixel.

First, at 102, an act of identifying red pixels in an input image is performed. The act 102 can be performed, for example, by accessing an input image having one or more red pixels. Identifying red pixels may include identifying pixels that have a predetermined degree of redness. For example, the act 102 can be implemented with the following equations:

$$\Omega = \{(r,s); \text{ for } x_{(r,s)1} > x_{(r,s)2} \text{ and } x_{(r,s)1} > x_{(r,s)3}\} \quad (1\text{-}1)$$

where $\Omega$ is the set of all red pixel locations in the image x. The comparisons $x_{(r,s)1} > x_{(r,s)2}$ and $x_{(r,s)1} > x_{(r,s)3}$ in Equation (1-1) may be performed in all pixel locations of x; that is, for $r=1, 2, \ldots, K_1$ and $s=1, 2, \ldots, K_2$. The act 102 may alternatively be implemented with one of the following redness detection equations or equation sets, for example:

$$x_{(r,s)1} > x_{(r,s)2} + \delta \text{ and } x_{(r,s)1} > x_{(r,s)3} + \delta \quad (1\text{-}2)$$

or $$2x_{(r,s)1} > x_{(r,s)2} + x_{(r,s)3} \quad (1\text{-}3)$$

or $$2x_{(r,s)1} > x_{(r,s)2} + x_{(r,s)3} + \delta \quad (1\text{-}4)$$

where $\delta$ is an adjustable parameter that may be tuned to filter out red colored noise attributed to the presence of non-eye red pixels (e.g., those corresponding to human skin, clothes, and background) in the image x.

At 104, an act of detecting redness contrast in a plurality of directions with respect to each red pixel may be performed. Thus red pixels at locations $(r,s) \in \Omega$ identified in Equation (1-1) (or its alternative forms) may be evaluated in terms of their redness contrast using both color and structural characteristics as follows:

$$\Psi = \{(r,s) \in \Omega; \text{ for } \beta_{(r,s)} - \beta_{(r-1,s)} > \eta \text{ or } \beta_{(r,s)} - \beta_{(r,s-1)} > \eta$$
$$\text{or } \beta_{(r,s)} - \beta_{(r,s+1)} > \eta \text{ or } \beta_{(r,s)} - \beta_{(r+1,s)} > \eta\} \quad (2)$$

where $\beta_{(.,.)} = 2x_{(.,.)1} - (x_{(.,.)2} + x_{(.,.)3})$ denotes the redness of a corresponding pixel $x(.,.)$ and $\eta$ is a nonnegative threshold used to control redness contrast detection performance. Equation (2) operates to identify red-eye pixels located on a retina's boundary based on the assumption that red-eye like pixels located on a retina's boundary are expected to have significantly higher redness $\beta_{(.,.)}$ than that of the neighboring pixels in at least one of four basic (e.g., up, down, left, right) directions. Therefore, by performing the act 104 transitions between the retina and iris areas and between the retina and glint areas are identified and thus a new subset of red pixels, $\Psi$, is identified from among the red pixels in $\Omega$.

Next, at 106, an act of enhancing redness of red pixels in $\Omega$ that have a predetermined level of redness contrast may be performed. For example, to increase the likelihood that pixels satisfying the color/structural constraint in Equation (2) are kept as candidate red-eye pixels throughout the detection procedure, their redness may be enhanced using a multiplier $\xi > 1$ as follows (assuming 255 is a maximum redness intensity value):

$$x'_{(r,s)1} = \min(255, \xi x_{(r,s)1}); x'_{(r,s)2} = x_{(r,s)2}; x'_{(r,s)3} = x_{(r,s)3}$$
$$\text{for } (r,s) \in \Psi$$

otherwise $$x'_{(r,s)1} = x_{(r,s)1}; x'_{(r,s)2} = x_{(r,s)2}; x'_{(r,s)3} = x_{(r,s)3} \quad (3)$$

The updated pixels $x'_{(r,s)} = [x'_{(r,s)1}, x'_{(r,s)2}, x'_{(r,s)3}]$ constitute an enhanced color image x' in which the redness of certain high red-contrast pixels is enhanced.

Next, at 108, an act of deriving color characteristics associated with the red pixels in the enhanced image x' may be performed. The color characteristics may include individual red pixel color characteristics and global red pixel color characteristics, which may be compared to identify candidate red-eye pixels. For example, in one embodiment, candidate red-eye pixels may be localized using global statistics of red pixels in x' as follows:

$$d_{(r,s)} = \begin{cases} 1 & \text{if } x'_{(r,s)1} - x'_{(r,s)2} > \bar{x}'_{RG} \text{ and } x'_{(r,s)1} - x'_{(r,s)3} > \bar{x}'_{RB} \\ 0 & \text{otherwise} \end{cases} \quad (4)$$

where $$\bar{x}'_{RG} = \left( \max_{(r,s) \in \Omega} \{x'_{(r,s)1} - x'_{(r,s)2}\} + \frac{1}{|\Omega|} \sum_{(r,s) \in \Omega} \{x'_{(r,s)1} - x'_{(r,s)2}\} \right) / 2 \quad (5)$$

$$\bar{x}'_{RB} = \left( \max_{(r,s) \in \Omega} \{x'_{(r,s)1} - x'_{(r,s)3}\} + \frac{1}{|\Omega|} \sum_{(r,s) \in \Omega} \{x'_{(r,s)1} - x'_{(r,s)3}\} \right) / 2 \quad (6)$$

are global R-G (red-green) and R-B (red-blue) color differences and $|\Omega|$ denotes the size of $\Omega$. These global statistics represent the average of the corresponding maximum and mean color differences in all pixel locations where the red component makes a dominant contribution. Performing Equation (4) in all pixel locations in the input image, that is, for $r=1, 2, \ldots, K_1$ and $s=1, 2, \ldots, K_2$ sets all pixels $d_{(r,s)}$ in a binary candidate red-eye pixel map d to indicate the presence of a red-eye pixel candidate (for $d_{(r,s)}=1$) or its absence (for $d_{(r,s)}=0$).

In an alternative embodiment, the binary candidate red-eye pixel map d may be formed without performing acts 106 and 108. Instead the binary map d may be formed after act 104 using the redness contrast evaluation performed by Equation (2). For example, the presence of a candidate red-eye pixel may be indicated by $d_{(r,s)}=1$ for $(r,s) \in \Psi$ or its absence may be indicated by $d_{(r,s)}=0$ for $(r,s) \notin \Psi$. In this way, Equation (2) can be used to set all pixels $d_{(r,s)}$ in the binary map d, for $r=1, 2, \ldots, K_1$ and $s=1, 2, \ldots, K_2$. Although using Equation (2) to form the binary map d may in some cases result in less accurate red-eye detection than using Equation (4), greater computational cost efficiency may be achieved as a trade-off.

Depending on the value of η in Equation (2), the detection process may allow for high detection rates. However, a high number of false positives, particularly in complex images with a number of red areas, may simultaneously be detected, which is particularly true in complex image scenarios. Therefore, to reduce detection of false positives in the binary map d, further evaluation may be performed.

For example, at 110, an act may be performed in which candidate red-eye pixels are partitioned into a set of one or more candidate red-eye objects and eliminating false positives based on the objects' geometric features. Any suitable object partitioning, labeling, and/or segmentation algorithm may be carried out that groups candidate red-eye pixels (i.e., pixels with $d_{(r,s)}=1$) that are adjacent to each other. The object partitioning procedure may partition the map d into N one or more unique objects $O_i = \{(r,s) \in \Phi_i; d_{(r,s)}^i=1\}$, for $i=1, 2, \ldots, N$ where n denotes the number of these unique objects, such that none of the partitioned objects is directly neighboring with another object from the set $\{O_i; i=1, 2, \ldots, N\}$. Each object may be characterized with $\Phi_i$, which is the set of pixel locations (r,s) where $d_{(r,s)}^i=1$, and a $\Phi_i^y \times \Phi_i^x$ bounding box with height $\Phi_i^y$ and width $\Phi_i^x$. Thus, any individual object $O_i$ can be seen as an image of dimensions $\Phi_i^y \times \Phi_i^x$ and can be considered separately from all other objects in $\{O_i; i=1, 2, \ldots, N\}$. Note that in order to reduce both noise and the number of objects in the binary map d, various preprocessing operations such as morphological filters can be applied to d prior to the object partitioning.

Next, at 112, an act of removing a candidate red-eye object from the set of one or more candidate red-eye objects may be performed by applying one or more geometric constraints. For example, geometric constraints may be applied to the set of one or more objects to exclude relatively large objects and/or objects that are characteristically diagonal in shape, e.g., as follows:

$$O_i = \begin{cases} \{d_{(r,s)}^i = 0; (r,s) \in \Phi_i\} & \text{if } \Phi_i^y > y_{max} \text{ or } \Phi_i^x > x_{max} \\ & \text{or } |\Phi_i|/(\Phi_i^y \Phi_i^x) \leq \lambda \\ O_i & \text{otherwise} \end{cases} \quad (7)$$

where $y_{max}$ and $x_{max}$ denote a predetermined maximum allowable height and width for an object, respectively. The shape of an object may be determined by calculating the ratio between the total number of object's pixels, $|\Phi_i|$, and the area of the bounding box, $\Phi_i^y \Phi_i^x$. Thus, the term λ denotes the minimum allowable ratio between $|\Phi_i|$ and $\Phi_i^y \Phi_i^x$.

Another geometric constraint may identify and eliminate from the set of objects horizontally and vertically oriented objects that are elongated beyond predetermined maximal values, e.g., as follows:

$$O_i = \begin{cases} \{d_{(r,s)}^i = 0; (r,s) \in \Phi_i\} & \text{if} \begin{pmatrix} (\Phi_i^y = C_m \text{ and } \Phi_i^x > D_m) \text{ or} \\ (\Phi_i^y > \chi \text{ and } \Phi_i^x/\Phi_i^y > \alpha) \end{pmatrix} \\ & \text{or} \begin{pmatrix} (\Phi_i^x = C_m \text{ and } \Phi_i^y > D_m) \text{ or} \\ (\Phi_i^x > \chi \text{ and } \Phi_i^y/\Phi_i^x > \alpha) \end{pmatrix} \\ O_i & \text{otherwise} \end{cases} \quad (8)$$

where $C_m$ and $D_m$, for $m=1, 2, 3$, are parameters used to evaluate small objects. The parameters χ and α may be used to evaluate objects of larger dimensions. In Equation (8), conditions in the first line correspond to horizontally oriented objects (i.e., $\Phi_i^y < \Phi_i^x$) whereas conditions in the second line correspond to vertically oriented objects (i.e., $\Phi_i^y > \Phi_i^x$).

Another geometric constraint may identify and eliminate from the set of objects straight line objects, e.g., as follows:

$$O_i = \begin{cases} \{d_{(r,s)}^i = 0; (r,s) \in \Phi_i\} & \text{if } |\Phi_i| > T_\Phi \text{ and} \\ & (|\Phi_i| = \Phi_i^x \text{ or } |\Phi_i| = \Phi_i^y) \\ O_i & \text{otherwise} \end{cases} \quad (9)$$

where $|\Phi_i|=\Phi_i^x$ or $|\Phi_i|=\Phi_i^y$ ensure that the object under consideration is a horizontal or vertical line, respectively. Parameter $T_\Phi$ denotes the minimum length of vertical and horizontal lines to be processed.

Next, at acts 114 and 116, the number of false positives remaining after applying geometric constraints may be further reduced by evaluating contextual aspects of the objects to determine whether the objects are part of human faces. Face detection may be used for this purpose. However, since face detection technologies are often complex and may not be sufficiently reliable, human skin color modeling rather than face detection may be used localize face-like areas.

First, at act 114, image-adaptive gamma correction may be performed on the input image using a gray-scale histogram of the input image. Gamma correction may improve the performance of human skin color modeling because input images with red-eye effects may vary significantly in their pixel intensities due to different illumination resulting from different ambient lighting conditions and/or different flash characteristics. Gamma correction or normalization of gamma characteristics in the input image may be performed on the input image x according to the following equations:

$$\tilde{x}_{(r,s)k} = 255\left(\frac{x_{(r,s)k}}{255}\right)^\gamma, \text{ for } k = 1, 2, 3 \quad (10)$$

where $r = 1, 2, \ldots, K_1, s = 1, 2, \ldots, K_2$, and $$\gamma = \min\left(1, \frac{q_1 \overline{G} + q_2 \overline{G}_5}{q_1 q_2}\right) \quad (11)$$

is an image-adaptive gamma value calculated using global statistics $\overline{G}$ and $\overline{G}_5$ of the image x. To increase computational efficiency, these statistics may be calculated from a histogram of gray-scale versions of color pixels in the input image x. Each color pixel $x_{(r,s)}=[x_{(r,s)1}, x_{(r,s)2}, x_{(r,s)3}]$ may be transformed into its gray-scale value $G_{(r,s)}$ via $G(r,s)=(x_{(r,s)1}+x_{(r,s)2}+x_{(r,s)3})/3$. Other, more sophisticated, color-to-gray-scale conversions can use different weights for each of the color components $x_{(r,s)1}, x_{(r,s)2}$, and $x_{(r,s)3}$. After the conversion has been completed, the histogram of $G_{(r,s)}$ values can be determined from which the two global statistics $\overline{G}$ and $\overline{G}_5$ may be derived as the mean histogram value and the mean of highest intensity histogram values, respectively. The highest intensity histogram values may include pixels having a gray-scale intensity value that is higher than a predetermined percentile (e.g., 95th percentile) of all gray-scale intensity values in at least a portion of the input image.

In flash-illuminated images, face-like areas are usually characterized by high gray-scale intensities as opposed to rather medium $\overline{G}$ due to a number of dark areas often present in the image background. Therefore, in Equation (11), parameters $q_1$ and $q_2$ may be used, respectively, to control the contribution of $\overline{G}$ and $\overline{G}_5$ to a gamma indicator value $(q_1\overline{G}+q_2\overline{G}_5)/(q_1 q_2)$. In addition, the minimum operator in Equation (11) may be used to prevent unnecessary darkening of the image by the gamma correction process in Equation (10). Equation (11) shows one example of an image-adaptive gamma value. However, it will be understood by those of ordinary skill in the art that other approaches for calculating a gamma value may be used.

After performing gamma correction at 114, an act of removing a candidate red-eye object from the set of one or more candidate red-eye objects may be performed at 116. Removal of a candidate red-eye object may be based on whether pixels of color tones corresponding to human skin-like color tones are detected in the gamma-corrected image in proximity to the candidate red-eye object. Although gamma correction is not necessary for successful detection of human skin-like pixels, the detection process may be improved if the input color pixels $x_{(r,s)}=[x_{(r,s)1}, x_{(r,s)2}, x_{(r,s)3}]$ are first transformed into their gamma-corrected versions $\tilde{x}_{(r,s)}=[\tilde{x}_{(r,s)1}, \tilde{x}_{(r,s)2}, \tilde{x}_{(r,s)3}]$ by operation of Equation (10). Operating on gamma-corrected pixels $\tilde{x}_{(r,s)}=[\tilde{x}_{(r,s)1}, \tilde{x}_{(r,s)2}, \tilde{x}_{(r,s)3}]$, each object from the set of objects $\{O_i; i=1, 2, \ldots, N\}$ can be evaluated with respect to its presence in a face-like area. For example, a check for pixels of human skin-like color may be made in eight compass directions from the center $(m_i, n_i)$ of object $O_i$, where $m_i=(r_{max}^i-r_{min}^i)/2$ and $n_i=(s_{max}^i-s_{min}^i)/2$ for $(r,s) \in \Phi_i$, e.g., as follows:

$$O_i = \begin{cases} \{d_{(r,s)}^i = 0; (r,s) \in \Phi_i\} & \text{if } \sum_{v=1}^{v=8} S_v < M; \\ O_i & \text{otherwise} \end{cases} \quad (12)$$

where $$S_v = \begin{cases} 1 & \text{if } \exists (r^v, s^v) \text{ for } \tilde{y}_{(r^v,s^v)} \in \Theta; \\ & |r^v - m_i| \leq D; |s^v - n_i| \leq D \\ 0 & \text{otherwise} \end{cases} \quad (13)$$

with $$D = \max(\varphi_1, \min(\varphi_2, \varphi_3(\Phi_i^x + \Phi_i^y)/2)) \quad (14)$$

controlled by parameters $\phi_1$ and $\phi_2$ denoting, respectively, the minimum and maximum allowed value of D, and parameter $\phi_3$ denoting the scaling factor of $\Phi_i^x+\Phi_i^y)/2$, which is the averaged dimension of object $O_i$.

An object may be considered a red-eye candidate if skin color is found within a distance D from $(m_i, n_i)$ in at least M of the eight possible directions indicated by $v=1, 2, \ldots, 8$. The set $\Theta$ in Equation (12) is a set of color component values corresponding to possible tones of skin color. The set $\Theta$ may be predetermined by applying a skin color model, e.g., as follows:

$$\Theta=\{(r,s); \text{ for } \theta_k^{min} \leq \tilde{y}_{(r,s)k} \leq \theta_k^{max}, k=1,2,3\} \quad (15)$$

where $\tilde{y}_{(r,s)}=[\tilde{y}_{(r,s)1}, \tilde{y}_{(r,s)2}, \tilde{y}_{(r,s)3}]$ is an equivalent of the gamma-corrected pixel $\tilde{x}_{(r,s)}=[\tilde{x}_{(r,s)1}, \tilde{x}_{(r,s)2}, \tilde{x}_{(r,s)3}]$ expressed in a particular color space. The terms $\theta_k^{min}$ and $\theta_k^{max}$ denote the predetermined limits or boundaries of the k th color component of $\tilde{y}_{(r,s)}$.

In addition to the various alternatives described above, various other versions of method 100 may be implemented including versions in which various acts are modified, omitted, or new acts added or in which the order of the depicted acts differ. In one embodiment, for example, one or more of acts 110-116 may be omitted. In other embodiments, one or more of acts 102-108, 114, and 116 may be omitted, or one or more of acts 102-108 and 112 may be omitted.

If, for example, acts 110-116 are omitted, candidate red-eye pixels may be identified based on levels of redness (act 102) and redness contrast (act 104) without partitioning the candidate red-eye pixels into objects (act 110) or evaluating geometric (act 112) and/or other contextual aspects, such as the presence of pixels with human skin-like color tones nearby (acts 114 and 116). As discussed above, redness contrast is a useful indicator of the presence of red-eye pixels because redness contrast in red-eye pixels is usually high relative to other red pixels in an input image. Therefore, candidate red-eye pixels may be identified on the basis of redness levels and redness contrast alone or in combination with criteria other than the specific criteria applied by acts 110-116.

Alternatively, if acts 104, 106, 114, and 116 are omitted, candidate red-eye pixels may first be identified based on redness levels without evaluating or making enhancements based on redness contrast levels (acts 104 and 106). Redness levels of pixels in the input image may be evaluated by performance of either one of or a combination of acts 102 and 108. Then, candidate red-eye objects may be identified from the candidate red-eye pixels (act 110) and any candidate red-eye object not satisfying certain geometric (e.g., shape and/or size) criteria (act 112) may be removed from the set of candidate red-eye objects.

However, instead of removing candidate red-eye objects based on geometric criteria or constraints, candidate red-eye objects may be removed from the set of candidate red-eye objects based on proximity to human skin-like pixels (act 116), in which case act 112 may be omitted and replaced with act 116. Moreover, as described above, the human skin-like pixels may be identified with the benefit of gamma correction (act 114).

In one alternative embodiment, proximity to skin-like pixels may be evaluated prior to object partitioning. Thus, for example, a set of candidate red-eye pixels may be identified based on redness and/or redness contrast levels. A pixel may then be removed from the set of candidate red-eye pixels if the pixel is not proximate to pixels with human skin-like color tones in a predetermined number of directions. Evaluating a pixel's proximity to human skin-like pixels may be performed in accordance with the techniques described above in connection with act 116 using the pixel's coordinates instead of the center coordinates $(m_i, n_i)$ of an object.

The acts in method 100 apply equations having various thresholds and other parameters. The thresholds and parameters may be predetermined (e.g., set by a user or factory set), adjustable by an end-user or technician, and/or automatically adaptive based on the particular qualities of an input image and/or desired performance results. For example, the thresholds and parameters may be set differently according to different input image sizes. Assuming an input image having a Quarter Video Graphics Array (QVGA) format with 240 by 320 pixels, an acceptable red-eye detection performance may be achieved with the settings described hereafter. In Equation (2) above, acceptable results may be obtained with $\eta=50$. Higher values of $\eta$ can reduce both the detection rate and the number of false positives, whereas smaller values will usually result in slightly higher detection and significant increase of false positives. Adjustment of parameter $\xi$ in Equation (3) does not have as much an impact on detection performance as adjustment of $\eta$ in Equation (2). Using $\xi=2$ produces satisfactory results, while much higher values can result in over-enhanced red components that are clipped in Equation (3) to a maximum value. For example, in a standard 8 bit per R, G, and B color component representation the maximum intensity value is 255. With parameters thus set, a red-eye detection rate of 80% in complex scenes and up to 95% in simpler scenes can be expected on QVGA-sized images.

Geometric constraints listed in Equations (7), (8), and (9) are image size specific. Operating on QVGA-size images, for example, Equation (7) can produce acceptable results with a maximum allowable height and width set to $y_{max}=15$ and $x_{max}=15$, and the shape parameter set to $\lambda=0.29$. Parameters $C_1=1$, $C_2=2$, $C_3=3$ and $D_1=3$, $D_2=5$, $D_3=6$ together with $\chi=3$ and $\alpha>1.75$ also produce acceptable results in Equation (8). Finally, $T_\Phi=5$ acceptably be used in Equation (9). With the foregoing parameters the amount of false positives can typically be reduced by up to several tens per image while rejecting (on average) only 2% of true red eyes.

To compensate for insufficient illumination of a captured scene, image-adaptive gamma correction may be performed by using Equation (11) with $q_1=330$ and $q_2=250$. In addition, true red eye objects are often surrounded by human skin-like pixels in at least seven directions; thus suggesting M=7 for Equation (12). Acceptable results on QVGA-size images can be obtained if the search range for human skin-like pixels is ranged from 2 to 20 pixels; that is, $\phi_1=2$ and $\phi_2=20$ in Equation (14). An acceptable value for the scaling parameter in the same equation is $\phi_3=3/2$. The skin color model in Equation (15) can be defined in any three-color basis space. For example, satisfactory results can be achieved in the perceptually uniform International Commission on Illumination (CIE) LUV color space (with $\tilde{y}_{(r,s)k}$ denoting the L (for k=1), u (for k=2), and v (for k=3) color components) using $\theta_1^{min}=22$, $\theta_1^{max}=100$, $\theta_2^{min}=5$, $\theta_2^{max}=70$, $\theta_3^{min}=-11$, and $\theta_3^{max}=30$. With the above-listed settings, false positives can be reduced by up to several hundred per image while reducing detection of true red eyes by only about 2% on average, resulting in a high overall detection rate in QVGA-size images.

The example embodiments disclosed herein may be embodied in other specific forms. The example embodiments disclosed herein are to be considered in all respects only as illustrative and not restrictive.

What is claimed is:

1. A method for red-eye detection in an input image, the method comprising the acts of:
enhancing redness of input image pixels having a threshold level of redness contrast;
identifying candidate red-eye pixels in the image with enhanced redness input image pixels;
forming a candidate red-eye pixel map by designating pixels in the enhanced image as candidate red-eye pixels if the pixels have a first threshold level of redness; and
using the candidate red-eye pixel map to identify one or more candidate red-eye objects;
wherein a pixel in the enhanced image has the first threshold level of redness if a red component thereof exceeds each of a plurality of other color components thereof by a first set of respective threshold amounts;
wherein the first set of threshold amounts are dependent on color characteristics of pixels in the input image that are identified as having a second threshold level of redness, and
wherein a pixel in the input image has the second threshold level of redness if a red component thereof exceeds each of a plurality of other color components thereof.

2. The method of claim 1 wherein a pixel in the input image has the second threshold level of redness if a red component thereof exceeds each of a plurality of other color components thereof by a second set of respective threshold amounts.

3. The method of claim 1, further comprising the acts of:
evaluating one or more geometric characteristics of each of the one or more candidate red-eye objects that are indicative of whether each object is likely to be a red-eye object.

4. The method of claim 3, wherein evaluating the one or more geometric characteristics of a candidate red-eye object includes determining whether the candidate red-eye object has a substantially elongated shape indicative of a non-red-eye object.

5. The method of claim 3, wherein determining whether the candidate red-eye object has a substantially elongated shape indicative of a non-red-eye object includes determining if the object is shaped substantially like a straight line or if the object is substantially elongated in at least one of a horizontal, vertical, and diagonal orientation with respect to an orientation of the input image.

6. The method of claim 5, wherein determining if the object is substantially elongated in a diagonal orientation includes:
calculating a ratio between a total number of pixels in the object and an area of a bounding box for the object; and
comparing the ratio to a diagonal elongation threshold.

7. A method for red-eye detection in an input image, the method comprising the acts of:
generating a gamma-corrected image by performing image-adaptive gamma correction on at least a portion of the input image based on gray-scale intensity values of input image pixels; and
identifying an object in the input image as a candidate red-eye object based on whether, in the gamma-corrected image, pixels of a human skin-like color are detected proximate to the object in a predetermined number of directions; and
wherein the image-adaptive gamma correction is performed using a gamma derived from a mean gray-scale intensity value of the input image pixels and a mean gray-scale intensity value of a set of high intensity input image pixels.

8. The method of claim 7, wherein a pixel is determined to be skin-like if color components of the pixel are within predetermined limits.

9. The method of claim 8, wherein the color components of the pixel are expressed in another color space before determining whether the pixel is skin-like, and
wherein the predetermined limits are inclusive.

10. The method of claim 7, wherein the image-adaptive gamma correction is performed using a gamma that prevents unnecessary darkening of the image.

11. The method of claim 7, wherein the set of high intensity input image pixels includes pixels having a gray-scale intensity value that is higher than a predetermined percentile of all gray-scale intensity values in at least a portion of the input image.

12. The method of claim 7, further comprising:
enhancing redness in pixels having a threshold level of redness contrast;
designating pixels in the enhanced image as candidate red-eye pixels if the pixels have a threshold level of redness; and
wherein the object identified as the candidate red-eye object is identified from among the candidate red-eye pixels.

13. The method of claim 7, further comprising:
evaluating one or more geometric characteristics of the candidate red-eye object that are indicative of whether the candidate red-eye object is likely to be a red-eye object.

14. One or more non-transitory computer-readable media having computer-readable instructions thereon which, when executed, implement a method for red-eye detection in an input image, the method comprising the acts of:

enhancing redness of input image pixels having a threshold level of redness contrast;

identifying candidate red-eye pixels in the enhanced image;

forming a candidate red-eye pixel map by designating pixels in the enhanced image as candidate red-eye pixels if the pixels have a first threshold level of redness; and using the candidate red-eye pixel map to identify one or more candidate red-eye objects;

wherein a pixel in the enhanced image has the first threshold level of redness if a red component thereof exceeds each of a plurality of other color components thereof by a first set of respective threshold amounts;

wherein the first set of threshold amounts are dependent on color characteristics of pixels in the input image that are identified as having a second threshold level of redness, and wherein a pixel in the input image has the second threshold level of redness if a red component thereof exceeds each of a plurality of other color components thereof.

15. One or more non-transitory computer-readable media having computer-readable instructions thereon which, when executed, implement a method for red-eye detection in an input image, the method comprising the acts of:

generating a gamma-corrected image by performing image-adaptive gamma correction on at least a portion of the input image based on gray-scale intensity values of input image pixels; and identifying an object in the input image as a candidate red-eye object based on whether, in the gamma-corrected image, pixels of a human skin-like color are detected proximate to the object in a predetermined number of directions; and wherein the image-adaptive gamma correction is performed using a gamma derived from a mean gray-scale intensity value of the input image pixels and a mean gray-scale intensity value of a set of high intensity input image pixels.

* * * * *